United States Patent

[11] 3,602,838

[72] Inventor Frank Stern
Pleasantville, N.Y.
[21] Appl. No. 745,827
[22] Filed July 18, 1968
[45] Patented Aug. 31, 1971
[73] Assignee International Business Machines Corporation
Armonk, N.Y.

[54] EXTERNALLY EXCITED LUMINESCENT DEVICES
25 Claims, 14 Drawing Figs.

[52] U.S. Cl. .................................................. 331/94.5,
148/175, 313/108, 317/234
[51] Int. Cl. .................................................. H01s 3/18
[50] Field of Search .......................................... 331/94.5;
317/234; 313/108 D

[56] References Cited
UNITED STATES PATENTS

| | | | |
|---|---|---|---|
| 3,245,002 | 4/1966 | Hall............................ | 331/94.5 |
| 3,302,051 | 1/1967 | Galginaitis................... | 313/108 |
| 3,309,553 | 3/1967 | Kroemer...................... | 313/108 |
| 3,412,344 | 11/1968 | Pankove...................... | 331/94.5 |
| 3,265,990 | 8/1966 | Burns et al................... | 331/94.5 |
| 3,248,669 | 4/1966 | Dumke et al. ................ | 331/94.5 |

OTHER REFERENCES

Alferov et al.: Chem. Abstracts, Vol. 69, Abstract No. 62840g, 1968.

Basov et al.: IEEE Jour. of Quant. Elect., Vol. QE-2, pp. 594– 97, Sept. 1966.

Melvgailis: App. Phys. Lett., Vol. 6, pp. 59– 60, Feb. 1965.

Rupprecht et al.: App. Phys. Lett., Vol. 11, pp. 81– 83, Aug. 1967.

Susaki et al.: IEEE Jour. of Quant. Elect., Vol. QE-4, pp. 422– 24, June 1968.

Primary Examiner—Ronald L. Wibert
Assistant Examiner—Edward S. Bauer
Attorney—Hanifin and Jancin ABSTRACT: The disclosure provides a semiconductor luminescent device which is excited by either an electron beam or a photon beam. Particularly, a solid-state semiconductor laser element is formed of two layers, the first of which is a thin layer at the bombardment surface and the second of which is a thicker layer supporting the active layer. The first layer has a smaller energy gap than the second layer. The active layer must have a smaller energy gap than the inactive layer at the lasing wavelength. Because the active layer emits recombination radiation at a longer wavelength than the region of strong absorption in the inactive layer, there is a reduction in the energy loss in the inactive layer. Coherent emission or lasing perpendicular to the front surface is produced by introducing feedback via reflecting front and back surfaces, one or both of which may contain coatings to enhance their reflectivity.

INVENTOR
FRANK STERN

BY
Bernard N. Wiener

ATTORNEY

N-TYPE SEMICONDUCTOR

P-TYPE SEMICONDUCTOR

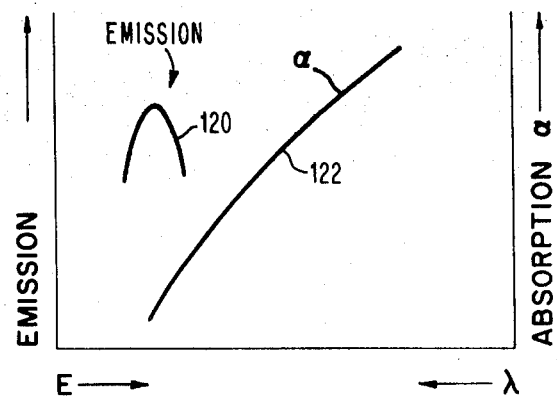
FIG. 4
FIG. 5A
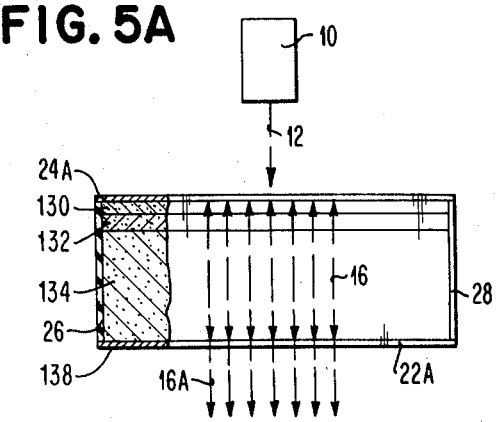
FIG. 5B
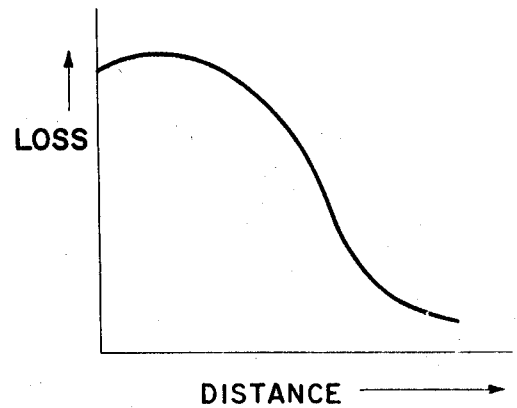
FIG. 6A
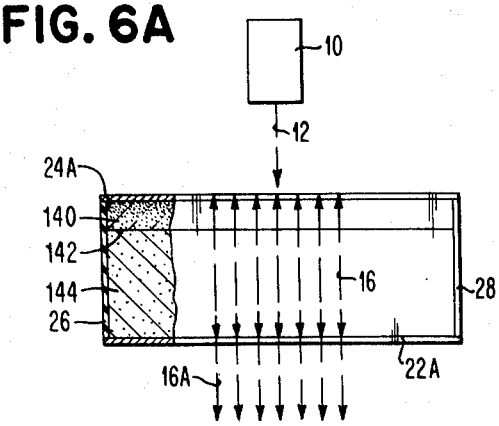
FIG. 6B
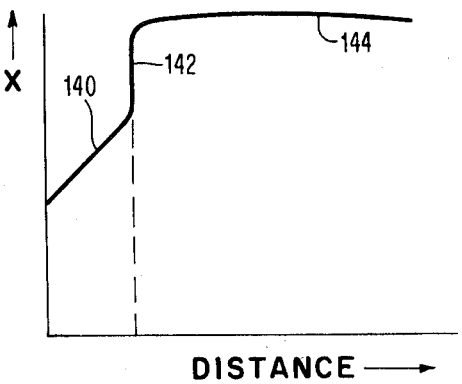

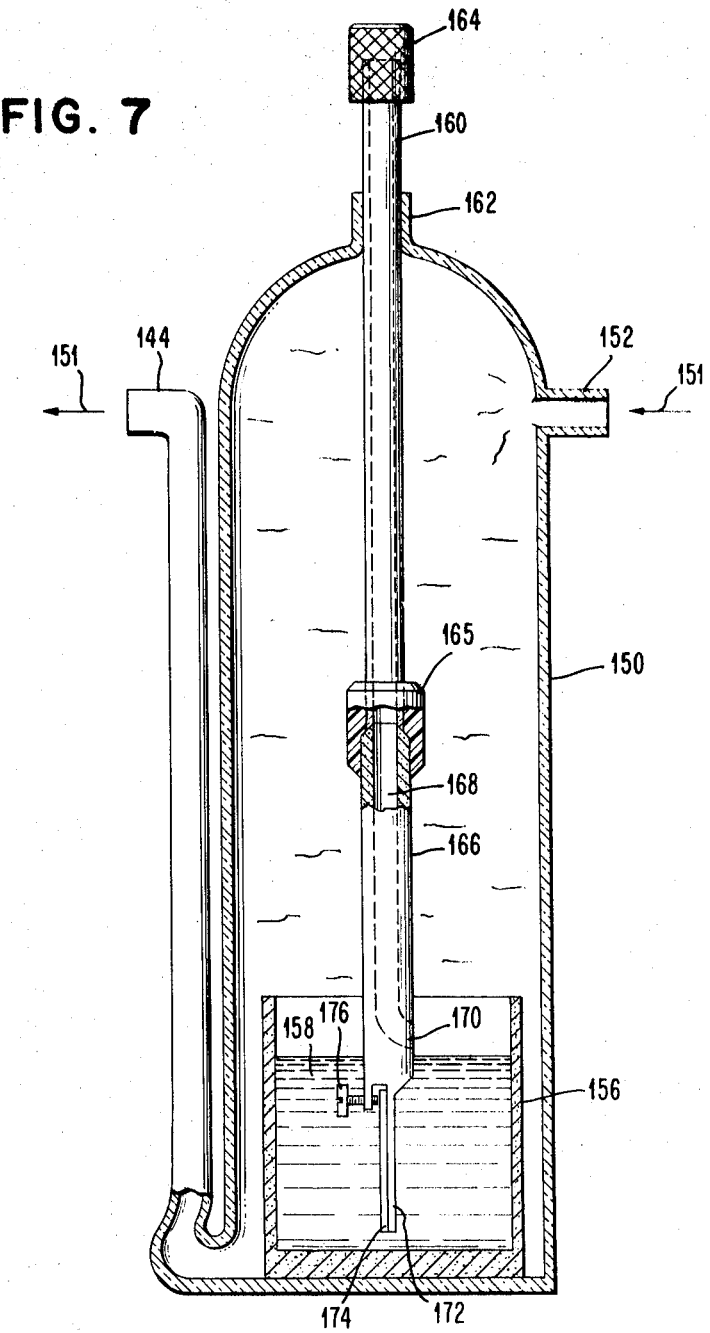

EXTERNALLY EXCITED LUMINESCENT DEVICES

BACKGROUND OF THE INVENTION

This invention relates generally to externally excited solid-state luminescent devices, and it relates more particularly to a solid-state semiconductor device which is externally excited by a radiation beam and which emits recombination radiation approximately perpendicular to the surface receptive of the beam.

Semiconductor lasers can be excited either by injection across a PN junction or by external excitation using an electron beam or light. In all the lasers that have been made so far, the lasing takes place in a direction approximately parallel to the active layer which is a thin layer (1 to 10 microns thick, in most cases) formed by the exciting electrons or photons. Lasing in a direction perpendicular to the active layer has been inhibited because the thickness of the amplifying medium is small in comparison to the thickness of the absorbing medium which adjoins it. It is desirable that an externally excited semiconductor laser have high efficiency, low threshold, and low loss. It is also desirable that lasing occur perpendicular to the active layer, since this would lead to a narrow beam and make possible external two-dimensional selection of the location of the lasing beam.

The structure provided by the practice of this invention provides a way to reduce the absorption in the inactive layer and therefore to facilitate the lasing in a direction perpendicular to the active layer. In this manner, there is achieved either a larger excited area with narrowing of the beam divergence of the lasing light or control of the location of the lasing region in a two-dimensional manifold.

A background article illustrative of the present day interest in laser technology is presented in the news magazine TIME, July 12, 1968, pages 42 to 49.

A background article for the technology of semiconductor lasers energized by an external electron beam is an article by B. Lax in the journal *Solid State Design*, Mar. 1965, pages 19 to 23.

Another article on an electron beam excited laser is presented in the *IBM Technical Disclosure Bulletin*, Vol. 8, No. 11, Apr. 1966, page 1655 by F. Stern.

A review of the semiconductor laser field is contained in the *I.E.E.E. Journal of Quantum Electronics*, Vol. QE-4, No. 4, Apr. 1968, pages 109 to 204.

An exemplary background reference on luminescent solids is the book, *Luminescence of Inorganic Solids*, P. E. Goldberg, Academic Press, 1966.

OBJECTS OF THE INVENTION

It is an object of this invention to provide an externally excited solid-state luminescent device.

It is another object of this invention to provide an externally excited solid-state semiconductor laser device.

It is another object of this invention to provide a solid-state semiconductor laser device which is externally excited by an electron beam.

It is another object of this invention to provide a solid-state semiconductor luminescent device, externally excited by a radiation beam, which emits recombination radiation approximately perpendicular to the surface receptive of the radiation beam.

It is another object of this invention to provide a solid-state semiconductor device, externally excited by a radiation beam, which emits recombination radiation approximately in the direction perpendicular to the surface receptive to the radiation beam and which has a varying composition of material from the front surface to the back surface which enhances preferentially emission of the recombination radiation in the noted direction.

It is another object of this invention to provide a solid-state semiconductor element suitable for use as the active element of an externally excited luminescent device wherein the element has a varying composition between two approximately parallel surfaces such that when a front surface is receptive of an exciting radiation beam, the element emits recombination radiation perpendicular to the receptive surface.

It is another object of this invention to provide recombination radiation from a solid-state semiconductor element disposed in the path of an electron beam and cooled sufficiently that recombination radiation is emitted from the element with high efficiency in a direction perpendicular to the surface receptive of the electron beam and wherein the element has a varying composition from the front surface to the back surface.

It is another object of this invention to provide a luminescent device according to the preceding object wherein the varying composition is achieved through a plurality of layers of semiconductor material.

It is another object of this invention to provide a luminescent device according to the preceding objects in which there is varying composition from the front surface to he back surface of a solid-state semiconductor luminescent device such that an active region is established adjacent the surface receptive of the energized radiation beam and the remainder of the element serves both as a substrate support for the active region and participates in supporting the emission of recombination radiation from the element.

It is another object of this invention to provide the foregoing devices and elements in such a manner that the resultant recombination radiation occurs with high efficiency, low threshold, and low loss.

SUMMARY OF THE INVENTION

The invention provides a semiconductor luminescent device which is excited by either an electron beam or a photon beam. Generally, a solid-state semiconductor element is provided with varying composition between two surfaces. A radiation beam incident at one surface causes emission of recombination radiation in a layer adjacent to the surface. The varying composition is such that the effective energy gap increases on going from the front to the back surface, and suitable reflecting layers are established on the front and back surfaces.

Particularly, a solid-state semiconductor laser element is formed of two layers, the first of which is a thin layer at the bombardment surface and the second of which is a thicker layer supporting the active layer. The first layer has a smaller energy gap than the second layer and is coextensive with the active layer is which recombination radiation is excited by the incident beam. The active layer emits recombination radiation at a longer wavelength than the region of strong absorption in the inactive layer, and there is a reduction in the energy loss in the inactive layer.

With a layered structure, the first layer is made approximately equal in thickness to the depth of penetration of the exciting beam and the resulting electronic excitation and constitutes the active layer. The second layer is sufficiently thick to provide necessary mechanical support and is of a different composition from the first layer to reduce or eliminate absorption of light generated in the active layer. Coherent emission or lasing perpendicular to the surface is produced by introducing feedback via reflecting front and back surfaces, one or both of which may contain coatings to enhance their reflectivity. Alternatively, one or both of the surfaces may have reflection-reducing coatings; and the feedback necessary for lasing can be achieved with external mirrors.

An exemplary structure is preferably formed by solution growth of $Ga_{1-x}Al_xAs$ so that different amounts of the constituents are introduced during the growth of the different layers. For an illustrative embodiment, the active layer may be GaAs and the inactive layer may be $Ga_{1-x}Al_xAs$ with $x>0$. Alternatively, both the active and inactive layers may be $Ga_{1-x}Al_xAs$ where the inactive layer has larger $X$ than the active layer and $x$ is less than 0.4 in the active layer. Alternatively, the active layer may be of the same basic composition as the inactive layer but has dopant impurities therein to lower the effective energy gap, e.g., through Zn diffusion into n-GaAs.

The foregoing and other objects, features, and advantages of the invention will be apparent from the following more particular description of preferred embodiments of the invention, as illustrated in the accompanying drawings.

BRIEF DESCRIPTION OF THE DRAWINGS

FIGS. 3A, 3B, and 3C are line diagrams illustrating the band structures of semiconductor crystals of which FIG. 3A is for an undoped crystal, FIG. 3B is for an N-type crystal, and FIG. 3C is for a P-type crystal.

FIG. 4 show graphs illustrating that the active layer of the luminescent semiconductor element has an emission spectrum significantly differently located than the absorption spectrum for the inactive layer.

FIGS. 5A and 5B relate to another embodiment of this invention, of which FIG. 5A illustrates a luminescent semiconductor element with two layers forming the active layer and FIG. 5B is a graphical representation of the energy loss of the impinging electron beam with distance of penetration into the surface.

FIGS. 6A and 6B relate to another embodiment of this invention, of which FIG. 6A has an active layer of continuously variable composition and FIG. 6B illustrates the mole fraction of a constituent in the active layer plotted versus the distance from the front surface of the active layer.

FIG. 7 is a line diagram showing a sectional view of apparatus useful for effecting growth by liquid phase epitaxy of a semiconductor body for practice of this invention.

EMBODIMENTS OF THE INVENTION

Figure 1A:
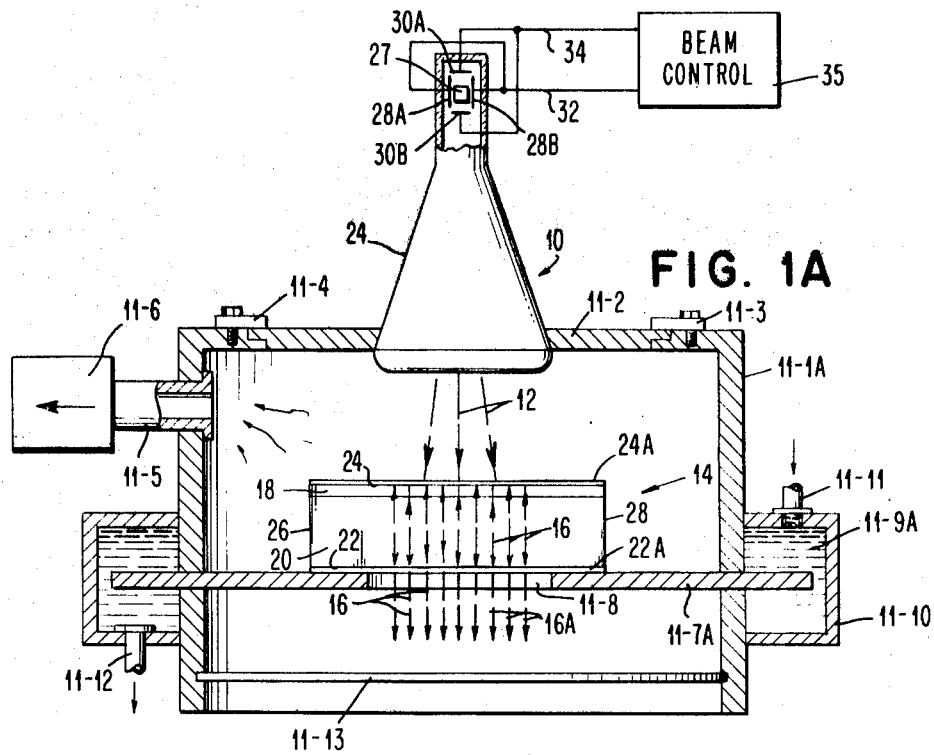
FIG. 1A is a schematic diagram of an embodiment of the invention showing a luminescent semiconductor element disposed in the radiation beam with the emitted recombination radiation being shown as propagating in the direction perpendicular to the surface of the element receptive of the beam.

The general nature and operation of an embodiment of this invention will now be described with reference to FIG. 1A which is a schematic diagram showing an electron beam source 10 providing an electron beam 12 to luminescent semiconductor element 14. Electron beam source 10 is supported by chamber 11–1A on horizontal member portion 11–2 which is rigidly held in vacuum type relationship with the main body of chamber 11–1A by bracket and pin members 11–3. Chamber 11–1A within which the luminescent semiconductor element 14 is situated is evacuated via pipe 11–5 by vacuum pump 11–6. Luminescent element 14 is supported on and cooled by plate 11–7A which has opening 11–8 therein through which the recombination radiation generated in the luminescent element 14 is emitted. Support and cooling plate 11–7A is supported by the frame of chamber 11–1A and projects into a coolant bath 11–9A within coolant bath container 11–10. The coolant 11–9A, e.g., liquid nitrogen at 77° K., enters via pipe 11–11 and exits via pipe 11–12. Chamber 11–1A has transparent window 11–13 through which the recombination radiation 16A from luminescent element 14 is propagated externally.

Luminescent element 14 has front layer 18 and bottom layer 20. The front surface 24 of layer 18 is receptive of the impinging radiation beam, 12 and the surface 22 of the support inactive layer 20 is receptive of the radiation 16 which propagates back and forth between surfaces 22 and 24 as the recombination radiation 16 builds up in intensity for lasing. A mirror reflective surface layer 24A is established on surface 24, and a partially transparent layer 22A is established on surface 22 of inactive layer 20. The laser recombination radiation 16A which is generated in the first layer 18 and transmitted by the second layer 20 exits from the surface 22 of body 20.

The generation of the electron beam 12 is achieved by electron gun 27, and the deflection of the electron beam 12 is achieved by x control electrodes 28A and 28B and Y control electrodes 30A and 30B to which are connected control wires 32 and 34, respectively. Beam control 35 is connected to x and y wires 32 and 34. By properly energizing control wires 32 and 34, the electron beam 12 is caused to be generated and to impinge at selected locations at the surface 24 of layer 18 of semiconductor body 14.

An exemplary background book on electron beam technology is, *Introduction to Electron Beam Technology*, R. Bakish, Editor, John Wiley and Sons, Inc., 1962.

Figure 1B:
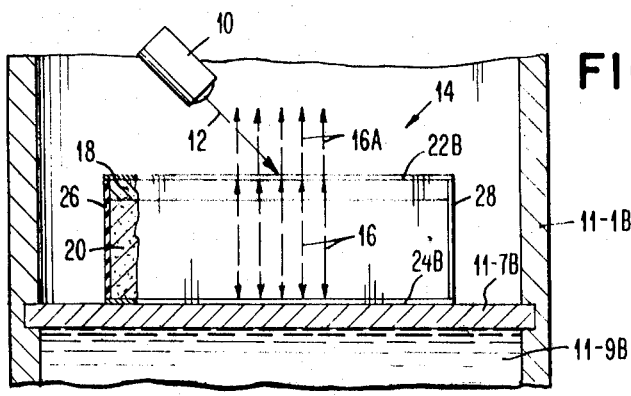
FIG. 1B is a schematic diagram of another embodiment of the invention for an exemplary high power operation showing the emitted radiation propagating from the same surface of the luminescent semiconductor element as is receptive of the radiation beam.

FIG. 1B is a schematic diagram of another embodiment of this invention, especially suitable for high power operation. The semiconductor element 14 is situated on a massive heat sink 11–7B which has complete contact with the reflective coating 24B, and heat bath 11–9B is in contact with the undersurface of the heat sink 11–7B. In this manner, by establishing the radiation source 10 at an angle from the surface of the luminescent element 14, the radiation beam 16A is caused to exit from the upper surface of the luminescent element 14. For FIG. 1B, the coating 24B is totally reflecting and the surface coasting 22B is partially reflecting to permit the exit of the stimulated beam 16 and emitted radiation 16A.

Figure 2:
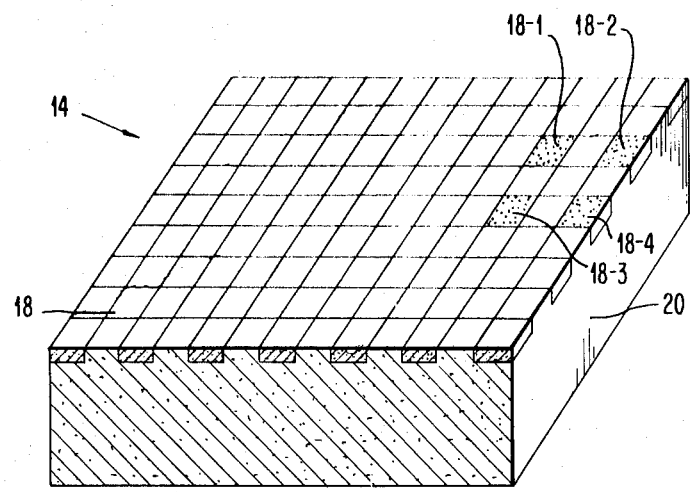
FIG. 2 is a perspective view of a luminescent semiconductor element for the practice of this invention showing the active layer as consisting of several diffused regions in the bulk of the supporting inactive region.

FIG. 2 is a schematic perspective view of a semiconductor body 14 with a special active layer 18 consisting of diffused portions 18–1, 18–2, 18–3, and 18–4, etc., which are established in the inactive layer 20 by diffusion therein of a P-type dopant impurity, e.g., zinc. The establishing of the diffusion pattern is accomplished by conventional diffusion and masking technique. An exemplary background reference on diffusion and masking is the book, *Microelectronics*, E. Keajian, Editor, McGraw-Hill Book Company, Inc., 1963.

In greater detail, in the case of electron beam excitation, the pumping source is an electron beam produced by an electron gun 10 as shown in FIG. 1A. The electrons impinge on the luminescent element 14 and produce electron-hole pairs in a layer called the active layer near the front surface 24 of the element. The material in the front layer 18 of the element 14 has a thickness comparable to the thickness of the active layer and has a composition such that the wavelength of the emitted light 16 is not strongly absorbed in the second or substrate layer 20. The light which is produced in he active layer 18 by radiative recombination of electrons and holes produces a laser oscillator (hereafter called a laser) if the excitation is strong enough to give amplification of light in the active layer 18 and if appropriate feedback is provided. One way to provide the feedback is through reflecting surfaces at the front and back of the sample shown as 22 and 24 in FIG. 1A. The usual lasing mode which is parallel to the active layer is inhibited by appropriate treatment of element 14 to reduce the feedback in this direction. Illustratively, this may be done by making the sides of element 14 rough or nonparallel or by adding nonreflecting coatings 26 and 28.

An alternative technique for reducing the feedback parallel to the active layer is shown in FIG. 2 in which islands of the active type of material are separated by regions having the same composition as the substrate. In this case the exciting beam must impinge primarily on one of these islands, for example, 18-1, 18-2, 18-3, and 18-4, and not in the intervening material, for lasing to occur.

Successful operation with an electron beam source normally requires pressures of the order of $10^{15}$ Torr or less. This is achieved with the vacuum system 11-6 adapted to the vacuum chamber 11-1 through the port 11-5. The electron gun 10 may have its own vacuum system if required.

Depending on the average power level desired, the appropriate heat sinking must be supplied. If an ambient temperature other than room temperature is to be used, the appropriate temperature control is provided by a coolant bath connected to the heat sink 11-7A in a conventional way. In particular, the coolant bath may be connected to a supply of liquid nitrogen for operation at 77° K. For low average power levels, adequate heat sinking is obtained by supporting the sample in good thermal contact with the ring support shown as 11-7A in FIG. 1A. For higher average power levels, the alternative arrangement of FIG. 1B is preferable. Here, a massive heat sink 11-7B is in good thermal contact with the back of the element 14. The electron beam 12 is brought in at an angle to the surface of layer 18, and the light is emitted from the top of the element 14. The light may be brought out of the vacuum either through an exit port or using one or more mirrors and an exit port in a conventional manner, not shown.

The reflecting layers 22A and 24B of FIGS. 1A and 1B are appropriately chosen for the particular operational circumstances. If the configuration of FIG. 1A is used, the layer 24A is a reflection enhancing layer, while the layer 22A may but need not be a reflection enhancing layer. In particular, the layer 22A may be omitted entirely and the surface of the material be used without any additional layer. For the configuration of FIG. 1B, the layer 24B between the second layer 20 of the sample and the heat sink 11-7B should be a totally reflecting layer which is established in good thermal contact with the luminescent element 14 and the heat sink 11-7B. The layer 22B on the front surface of the sample may be either reflection enhancing or inhibiting, depending on the optical system used; or the front surface may be used without any additional layer. The nature and operation of layers for obtaining the desired reflectivity modification is well known in the laser art.

PHYSICS OF THE INVENTION

Figure 3A:
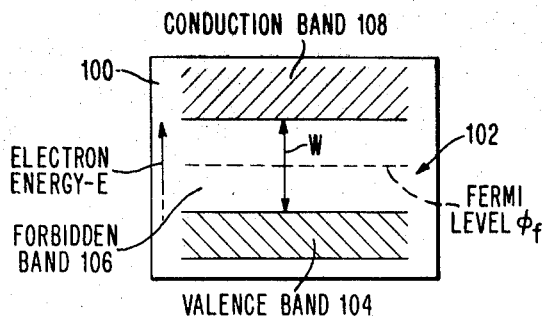
Figure 3B:
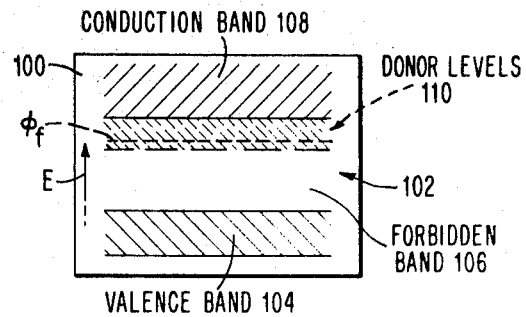
Figure 3C:
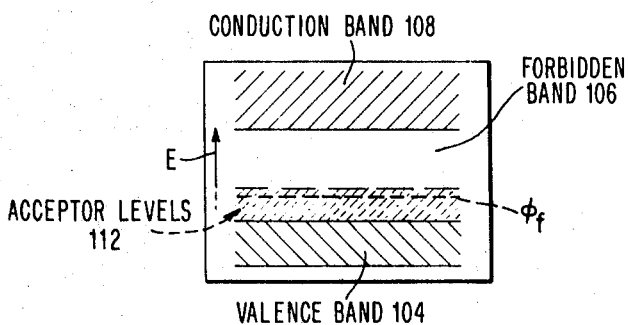

The physics of the operation of this invention will be discussed with reference to the line diagrams of FIGS. 3A, 3B, 3C, and 4. In FIG. 3A a semiconductor crystal 100 is shown with its band structure 102 established within the boundaries thereof for illustrative purpose. The vertical axis represents the electron energy E. The band structure includes a valence band 104, a forbidden band 206, and a conduction band 108. The Fermi level $\Phi_f$ is located within the forbidden band. The energy gap width of the forbidden band is indicated by two-way arrow W. In FIG. 3B the semiconductor crystal is heavily doped with donor impurity elements, thereby obtaining an N-type semiconductor. The bank structure is patterned after the illustration of FIG. 3A. As result of donor elements in the semiconductor crystal lattice, there are donor levels near the conduction band edge; and the Fermi level $\Phi_f$ is raised towards the conduction band edge. In FIG. 3C there is illustrated the effect of the presence of a heavy doping of acceptor impurity elements in the semiconductor crystal lattice, thereby obtaining a P-type semiconductor. There are, in addition to the bank structure 102 of FIG. 3A, acceptor hole energy levels 112 near the valence band edge. The Fermi level has moved closer to the valence band edge.

The effective energy gap, as measured by the position of the absorption edge 122 or by the spontaneous emission peak 120 in FIG. 4, of an impure semiconductor may be larger or smaller than the energy gap of the same semiconductor without impurities. For example, in the case of III–V semiconductors, acceptor impurities (up to about $10^{19}$ per cm.$^3$) tend to lower the effective energy gap, especially if compensated by donor impurities, and uncompensated donor impurities tend to increase the effective energy gap. A material with a smaller energy gap than a second material will emit band-edge recombination radiation at a longer wavelength than the second material.

FIG. 4 illustrates that the emission spectrum 120 of active layer 18 should be strongly outside of the absorption spectrum 122 of inactive layer 20.

In greater detail, the absorption and emission of a semiconductor crystal is determined by the distribution of energy levels in the conduction and valence bands. For an impure P-type semiconductor crystal as shown in FIG. 3C, the acceptor levels modify the density of states near the valence band edge and produce a tail in the density of states which decrease toward the middle of the forbidden band 106 and which merges with the states of the original valence band 104. When electron-hole pairs are produced in the semiconductor crystal by external excitation, the resulting recombination radiation emission has a peak whose position depends on the energy gap of the material and on the distribution of impurity levels. Increasing acceptor concentration tends to move the emission peak toward longer wavelengths.

The absorption of the material is also determined by the energy gap and the distribution of impurity levels. For an N-type semiconductor crystal, the absorption edge in the presence of high net impurity concentrations can be moved to higher energies because of the shift of the Fermi level into the conduction band. Therefore, if the first layer 18 of FIG. 1A is appropriately doped P-type material (with net acceptor concentration on the order of 1 to $5\times10^{18}$ cm.$^{13}$) and the substrate 20 of FIG. 1A is N-type material with net donor concentrations of the order of 1 to $4\times10^{18}$ cm.$^{13}$, the emission generated in the P-type layer (shown as 102 in FIG. 4) will be at longer wavelengths than the region of strong absorption in the N-type layer shown as curve 122 in FIG. 4.

An alternative way to move the emission peak in the first layer 18 to longer wavelengths than the region of substantial absorption in the second layer 20 is to have the chemical compositions of the two layer appropriately chosen so that the energy gap in the first layer is smaller than the energy gap in the second layer. The difference in energy gaps should be approximately equal to or greater than the line width of the emitted light which is typically of the order of 20 to 100 mev. Such a variation in energy gaps is easily obtained by variation of the mole fraction $x$ in $Ga_{1-x}Al_xAs$. As $x$ varies from zero to approximately 0.4, the energy gap increases from about 1.4 ev. to about 1.9 ev. Thus, a change in $x$ of approximately 0.1 leads to a change in energy gap of the order of 100 to 125 mev.

When a electron beam or a light beam strikes the surface of a semiconductor element, a fraction of the energy in the beam is converted to the excitation of electron-hole pairs by excitation of electrons from the valence band to the conduction band of the material as illustrated in FIGS. 3A, 3B, and 3C. The thickness of the layer in which the electron-hole pairs are produced depends on the penetration distance of the exciting beam. For electron beam 12, the active layer thickness ranges from approximately 1 or 2 microns if the electrons have low kinetic energy (about 30 kev.) up to approximately 20 or 30 microns if the electrons have high kinetic energy (about 100 to 150 kev.).

In the case of optical excitation, the thickness of the layer 18 of FIG. 1A is approximately the reciprocal of the absorption constant for the exciting light and for typical cases of strongly absorbed light will be of the order of 1 micron.

The amount of excitation of the system depends on the pumping rate, which is the rate at which energy is supplied by the exciting source 10. For sufficiently high pumping rates, the semiconductor layer 18 has a population inversion which means that some of the photons produced by the radiative recombination of electrons and holes in the active layer are amplified. When suitable feedback is provided as for example by the reflecting layers 22A and 24A of FIG. 1A, the amplification leads to coherent stimulated emission for a laser oscillator.

If, as in FIG. 1A, the lasing direction is perpendicular to the active layer, it is important that the losses due to absorption of the emitted light in the substrate 20 be reduced as much as possible. This can be achieved by having the front layer 18 of the sample be a different composition from the substrate such that the emitted light has a longer wavelength than the absorption edge in the substrate material. The optimum effect can be achieved if the front layer 18 has approximately the same thickness as the active layer mentioned above. Therefore, this optimum thickness depends on the type and the energy of the exciting radiation 12. In practice for electron beam excitation, the front layer 18 is initially chosen to have a thickness approximately equal to the known penetration depth of the electron beam; and the energy of the electron beam is then adjusted to give optimum results.

MATERIALS OF THE INVENTION

The composition of the front layer 18 required to achieve the effects described above are realizable in a number of ways. One way is the diffusion of an acceptor, preferably Zn, into N-type semiconductor material such as GaAs. The thickness of the layer is determined by the temperature and duration of the diffusion procedure. For example, a 5 micron thick layer is produced by diffusion from a $ZnAs_2$ source. A reference article on Zn diffusion in GaAs is in the *IBM Journal of Research and Development*, Vol. 12, 1968, page 272 by J. C. Marinace et al. If the system is heated to 840° C. in 10 minutes and cooled to room temperature, thicker or thinner layers are achieved by appropriate changes in the time-temperature schedule. The average doping level in the active layer 18 is preferably in the range of 2 to $6\times10^{18}$ cm.[13]. Diffusion through a layer of silicon dioxide or other diffusion mask will reduce the surface concentration, and the time-temperature schedule must be extended to provide the desired depth of the layer 18. The effect of the Zn diffusion is to lower the effective energy gap of the front layer 18 compared to that of the N-type substrate 20 with the result shown in FIG. 4.

Figure 8:
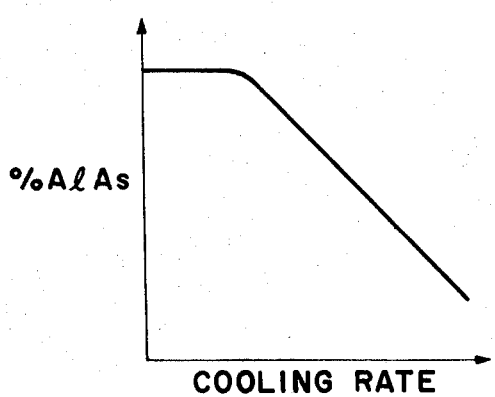
FIG. 8 is an idealized graph illustrating the percent AlAs present in a layer of $Ga_{1-x}Al_xAs$ by growth in the apparatus of FIG. 7 versus the cooling rate.
Figure 9:
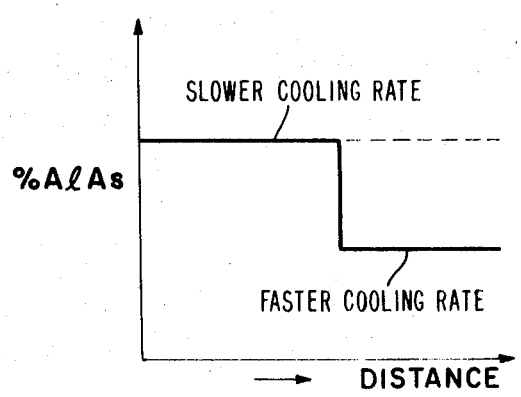
FIG. 9 is an idealized graph illustrating the percent AlAs present in a layer of $Ga_{1-x}Al_xAs$ grown in the apparatus of FIG. 7 versus distance in the layer from the initial growth interface for two different cooling rates.

Alternatively, the front layer 18 can be formed by solution growth. For example, a GaAs layer may be grown onto a $Ga_{1-x}Al_xAs$ layer or both the front layer 18 and the substrate may be $Ga_{1-x}Al_xAs$, but the front layer has a lower Al mole fraction. The variation of Al mole fraction can be achieved in a number of ways. One way is the normal variation in mole fraction during solution growth which results from the depletion of Al in the melt. A second method uses a variation in the cooling rate during growth as shown in FIGS. 8 and 9. Another technique is the addition of oxygen during the growth. The appropriate net impurity concentration in the surface layer 18 is chosen empirically to optimize the lasing output in this layer and may typically be of the order of a few times $10^{18}$ donors or acceptors per cm.[3].

MODIFICATIONS OF THE INVENTION

An alternative structure for a luminescent element 14 to the ones shown in FIGS. 1A, 1B, and 2 is one in which the front layer is divided into two parts shown as 130 and 132 in FIG. 5A. The operation of this structure requires that the effective energy gaps increase on going from the layer 130 to the layer 132 to the substrate 134. The operation of this device makes use of the known energy loss of an electron beam in penetrating a solid, illustrated schematically in FIG. 5B and described more fully in the exemplary article, "The Excitation Mechanism in Electron Beam Pumped Lasers," by C. A. Klein, in the book *Physics of Quantum Electronics*, McGraw-Hill Book Company, Inc., 1966, pages 424 to 434. The energy loss is slowly rising near the surface, has a broad peak at some characteristic depth in the material, and then falls off with increasing depth. To make use of the divided front layer shown in FIG. 5A, the energy of the electron beam 12 is varied by beam control 35 in such a way that the major energy loss occurs either in layer 130, i.e., for a low electron beam energy, or in the layer 132, i.e., a higher electron beam energy. In the first case the light generated in layer 130 is not absorbed in layers 132 and 134 because these have larger energy gaps. In the second case the light is generated primarily in layer 132 and layer 130 is excited sufficiently by the electron beam so that it does not have strong absorption. The reflecting layers 22A and 24A are chosen appropriately as described in connection with FIG. 1A and 1B.

Still another modification of the invention is shown in FIG. 6A in which the front layer has a continuous variation of composition so that the energy gap is continuously increasing with distance from the front surface. In FIG. 6A increasing the energy of the electron beam 12 allows the region of maximum energy loss to be placed further and further from the front surface of layer 140 with the result that the peak of the emitted radiation can be tuned by varying the energy of the electron beam. In FIG. 6A the boundary 142 between the front layer 140 and the substrate layer 144 may but need not represent a discontinuity in composition. The structure 6A is best realized by using liquid phase epitaxy of $Ga_{1-x}Al_xAs$. The substrate layer 144 is grown first at a slow cooling rate and the layer 140 with varying composition is then grown at an increasing cooling rate to obtain a reduced mole fraction of Al. The variation of mole fraction with distance from the surface of layer 140 is shown schematically in FIG. 6B.

The luminescent device structures 14 shown in FIGS. 1A, 1B, 2, 5A, and 6A have planar surfaces. The surface may also be curved. Lasing action perpendicular to the surface is achieved if the front and back surfaces are approximately parallel locally. Beneficial use of the structures of FIG. 1A, 1B, 2, 5A and 6A may also be obtained when lasing is not achieved, since the loss reduction made possible by these structures is also beneficial for spontaneous emission of light.

The practice of this invention has been described primarily with excitation of the luminescent device 14 by an electron beam. This mode of excitation has a number of advantages. In particular, the requisite high average power levels when desired, the variation of the depth of penetration of the exciting electrons, and the simplicity of deflection over a two-dimensional manifold. The alternative method of excitation uses a light beam 12 which is typically absorbed from a radiation source 10 in distances of the order of 1 or 2 microns in element 14 if the radiation has photon energy well above the energy gap of the front layer 18. The luminescent device structure of either FIG. 1A or FIG. 1B may conveniently be used. The front layer 18 is of the order of 1 or 2 microns thick. For the structures shown in FIGS. 5A and 6A, the required depth of penetration of the light is not as easily realized because of the requisite high intensity light excitation.

While GaAs and $Ga_{1-x}Al_xAs$ have been used as the principal examples for the materials used for the luminescent structures 14 in FIGS. 1A, 1B, 2, 5A, and 6, other materials are also suitable. In particular, if lasing action is required and the composition variation is achieved by doping, then any direct gap semiconductor is suitable, for example from the III–V or IV–VI compound semiconductors. If the composition variation is achieved with a ternary alloy, then ternary alloys in the III–V, II–VI or IV–VI compounds may be used. If the structures are not for spontaneous emission rather than stimulated emission, materials with indirect energy gaps may be used.

SEMICONDUCTOR GROWTH BY LIQUID PHASE EPITAXY

A teaching on crystal growth by liquid phase epitaxy is presented in copending U.S. Pat. application Ser. No. 646,315, filed June 15, 1967, by H. S. Rupprecht et al., and assigned to the assignee hereof. A related article is presented in *Applied Physics Letters*, Vol. 11, 1 Aug. 1967, pages 81 to 83, by H. Rupprecht et al.

FIG. 7 is a schematic diagram of apparatus suitable for growing a semiconductor crystal compound by liquid phase epitaxy. Quartz chamber 150 is provided within which the preparation of the compound is obtained. Orifice 152 is the inlet for a high purity inert gas used during the steps of the procedure. After having served its intended purpose during the stops of the procedure, the inert gas introduced via orifice 152 exits from chamber 150 via orifice 154. A crucible 156 of $Al_2O_3$ is established within chamber 150. The components of a ternary compound, e.g., Ga, Al, and As, are established as a liquid in equilibrium at a given temperature in the crucible 156. The heat source whereby the liquid 158 is raised in temperature and the heat sink whereby the temperature of liquid 158 is lowered are not shown. For convenience, a vertical tubular electric furnace with temperature control can be used for both the heat source and heat sink and the ambient environment providing sufficient temperature for cooling. Quartz tube 160 is introduced into chamber 150 via orifice 162. Removable cap 164 is placed on top of tube 160. Quartz tube 160 is connected by coupling 165 to a graphite piece 166 which has a tube portion 168 therein connecting to the tube portion of tube 160. Orifice 170 of tube 168 exits just about the surface of liquid 158. Graphite portion 166 is machined to have a lower extending portion 172 upon which a solid substrate, e.g., single crystalline GaAs layer 174 is affixed by the thrust of screw 176.

After the growth of requisite semiconductor body for use as a luminescent element 14, e.g., FIG. 1A, the GaAs substrate 174 is removed by grinding or etching in a conventional manner.

A crucible 156 is selected which does no react with the components of the liquid 158 at the temperature of growth of the crystalline compound. A suitable pressure of the inert gas 151 introduced at orifice 152 is maintained in chamber 150 to inhibit vapor formation of highly volatile components in the liquid 158 and further to preclude any undesirable reactions in the liquid 158 with contaminants that might otherwise be introduced into chamber 150. Illustrative inert gases suitable for the gas 151 are argon and helium. Another gas which is inert for the liquid 158 consisting of the components Ga, Al, and As, is high purity forming gas, e.g., 10 percent $H_2$+90 percent $N_2$.

In an illustrative operation for growing a layer of $Ga_{1-x}Al_x$As, crucible 156 is loaded with the components Ga, Al, and As for a suitable liquid in equilibrium at a given temperature, e.g., 20 grams Ga, 0.055 grams Al (generally, Al can be from 0 to 0.200 grams), and excess of pure GaAs e.g., 3.5 grams GaAs. When required, a dopant of one conductivity type is established in a predetermined concentration in the liquid 158, e.g., for an N-type semiconductor, prepared with the foregoing components, 0.005 grams Te is introduced into liquid 158. The crucible 156 is introduced in chamber 150 through a port, not shown. The quartz tube 160, graphite portion 166 are coupled via connection 167 together with a substrate 174, e.g., GaAs, with the surface main face perpendicular to the <100> crystalline direction, affixed to the extending portion 172 and is established in chamber 150 above liquid 158. The chamber 150 is flushed with inert gas 151, and a suitable pressure thereof is maintained in the chamber. In one illustrative operation for heating the liquid 158, the entire chamber 150 is placed onto an isothermal furnace maintained at a given temperature for equilibrium of the liquid 158, e.g., 960° C. A suitable time is awaited so that the liquid 158 achieves equilibrium at the given isothermal temperature, e.g., 5 minutes. Substrate 174 is then immersed in the liquid 158, a period of time is allowed to elapse so that the substrate 174 achieves equilibrium with the liquid 158 at the operational temperature. It has proven to be convenient to lower the temperature of liquid 158 slightly before introducing the substrate 174, e.g., lowering by 20° C., and after the substrate 174 has been introduced into the liquid 158 to raise the temperature somewhat, e.g., by 10°, so that the temperature at which the initiation of the growth is to occur is at preselected temperature, e.g., 950° C. The raising of the temperature by 10° C. also results in good wetting of the melt to the GaAs substrate 174. For a uniform composition of a grown layer of $Ga_{1-x}Al_x$As on substrate 174, a particular cooling rate is selected, e.g., from 0.5° C. to 1.0° C. per minute; and the cooling at this rate is continued until a required layer of thickness of the crystalline compound is obtained.

When it is desired to grow a PN semiconductor junction in the growing layer, the initial liquid is doped with a dopant of one conductivity type, e.g., 0.005 grams Te, and after a particular thickness has been obtained, e.g., cooling from 950° C. to 915° C., the cooling is stopped and a portion of a P-type dopant, e.g., Zn, is introduced via cap 164 to tube 160, and it falls through orifice 170 into liquid 168. The temperature of the liquid 158 is then raised somewhat, e.g., to 920° C.; and an appropriate period of time is allowed to elapse, e.g., 5 minutes, to obtain equilibrium in the liquid 158. Thereafter, cooling is continued at the previous preselected cooling rate; and finally, the cooling is terminated when a desired thickness of the resultant crystalline is obtained, e.g., when the temperature has reached 860° C.

By abruptly increasing the cooling rate over the cooling rate selected as above for a layer of $Ga_{1-x}Al_x$As with uniform composition e.g., to greater than 10° C. per minute, essentially pure GaAs is deposited by liquid phase epitaxy; and there is established a heterojunction of $Ga_{1-x}Al_x$As and GaAs.

FIGS. 8 and 9 present idealized graphs. In FIG. 8 the percentage AlAs in a liquid solution in equilibrium of Ga, Al, and As with respect to cooling rate has an essentially horizontal portion for equilibrium cooling and a linear change as the cooling rate is changed thereafter. In FIG. 9 the percentage AlAs in a liquid solution in equilibrium at a given temperature is plotted versus distance from the initial growth interface at the substrate. Two levels are shown in the idealized curve of FIG. 9. For a slower cooling rate, there is a higher percentage AlAs in the grown layer; and for a faster cooling rate, there is a lesser percentage AlAs in the grown layer.

THEORY OF THE INVENTION

Improved operation of semiconductor luminescent devices, including lasers, excited by external sources such as electron or photon beams is obtained from a structure in which a thin layer at the bombarded surface is of different composition from the bulk of the structure in the direction of the beam. The thickness of this layer is of the order of the penetration depth of the exciting beam, which is of the order of 1 to 20 microns for electron beam bombardment of most III-V and II-VI semiconductors. The composition of the surface active layer is such that the layer has a smaller effective energy gap than the inactive layer. This will reduce the absorption in the inactive layer of recombination radiation generated in the active layer.

The reduction in the energy gap of the surface active layer relative to the supporting inactive layer is achievable as follows:

1. Through diffusion of P-type dopant impurities into an N-type substrate;

2. Through solution growth or vapor growth of properly doped and compensated material onto the surface; and 3. Through forming of a heterojunction by solution growth or vapor growth.

While the invention has been particularly shown and described with reference to preferred embodiments thereof, it will be understood by those skilled in the art that the foregoing another changes in form and details may be made therein without departing from the spirit and scope of the invention.

What is claimed is:

1. A luminescent device comprising:
   a solid-state semiconductor element with varying composition of material between two approximately parallel surfaces thereon of such nature that the energy gap thereof proximate to one surface is relatively smaller than the energy gap adjacent to the other surface and that recombination radiation generated in the material proximate to said one surface is not significantly absorbed in the material adjacent to said other surface, the peak of the emission spectrum of said recombination radiation being at lower photon energies than the photon energies of relatively high absorption in the absorption spectrum of said material adjacent to said other surface; and a radiation beam source disposed to provide said radiation beam to said one surface to generate said recombination radiation in said material having said relatively smaller energy gap;

whereby said recombination radiation is emitted from said device preferentially perpendicularly to said surfaces.

2. A luminescent device as set forth in claim 1 wherein reflecting layers are disposed on said two surfaces and amplification of said recombination radiation occurs in said material.

3. A luminescent device comprising:

a solid-state semiconductor element having a front one surface and a back other surface approximately parallel thereto with varying composition of material therebetween such that the energy gap of said material proximate to said front surface is relatively smaller than the energy gap thereof proximate to said back surface and that recombination radiation generated proximate to said one surface is not absorbed significantly proximate to said other surface, the peak of the emission spectrum of said recombination radiation being at lower photon energies than the photon energies of relatively high absorption in the absorption spectrum of said material adjacent to said other surface; and an electron beam radiation source disposed to provide said electron beam to said one surface of said semiconductor element to generate said recombination radiation in said material having said relatively smaller energy gap;

whereby said recombination radiation is emitted from said device preferentially perpendicularly to said surfaces.

4. A luminescent device as set forth in claim 3 wherein said electron beam source provides said electron beam with variable energy to select a given depth in said semiconductor element for generating said recombination radiation preferentially thereat.

5. A luminescent device as set forth in claim 3 wherein said varying composition results from one layer proximate to said one surface with a relatively small energy gap and from another layer bounding said one layer and being proximate to said other surface and having relatively large energy gap.

6. A luminescent device as set forth in claim 5 wherein said one layer has a gradient of composition therein.

7. A luminescent devices as set forth in claim 6 wherein electron beam source provides said electron beam with variable energy to select a given depth in said one layer for generating said recombination radiation thereat.

8. A luminescent device as set forth in claim 5 wherein said one layer consists of a plurality of other layers each with a different composition.

9. A luminescent device as set forth in claim 8 wherein said electron beam source provides said electron beam with variable energy to select one of said other layers for generating said recombination radiation preferentially therein.

10. A laser comprising:

a source of an energetic radiation beam;

a semiconductor element disposed in he path of said energetic radiation beam and having a first front layer coextensive with an active layer therein receptive of said beam and a second and inactive back layer beneath said front layer approximately parallel thereto, said front layer having relatively smaller energy gap than said back layer;

first and second radiation reflective surfaces on said front and back layers respectively, said active layer providing stimulated recombination radiation generated through conversion therein of the energy of said energetic beam, the peak of the emission spectrum of said radiation in said front layer being at lower photon energies than the photon energies of relatively high absorption in the absorption spectrum of said back layer;

whereby said stimulated recombination radiation is emitted from said laser device preferentially perpendicularly to said surfaces.

11. A laser device as set forth in claim 10 wherein said active layer has relatively small dimension in the direction of propagation of said radiation beam and relatively large dimension transverse thereto.

12. A laser device as set forth in claim 11 wherein said first layer and said second layer consist of the same semiconductor material with different dopant impurity concentrations such that said first layer has a smaller effective energy gap than said second layer.

13. A laser device as set forth in claim 12 wherein said second layer is N-type GaAs and said first layer is P-type GaAs.

14. A laser device as set forth in claim 13 wherein P-type GaAs is obtained by diffusion of acceptor dopant impurity.

15. A laser device as set forth in claim 14 wherein said P-type dopant impurity is Zn.

16. A laser device as set forth in claim 15 wherein said Zn in said GaAs is approximately $5 \times 10^{18}$ atoms/cm.

17. A laser device as set forth in claim 10 wherein said layers consist of $Ga_{1-x}Al_xAs$ where said first layer has smaller $x$ but $x$ 0.4 in the first layer.

18. A laser device as set forth in claim 10 wherein said first layer is GaAs and said second layer $Ga_{1-x}Al_xAs$ where $x>0$.

19. A laser device as set forth in claim 10 wherein said first layer consists of a checkerboard pattern disposed as islands in said second layer.

20. A laser device as set forth in claim 10 wherein said radiation beam is an electron beam.

21. A laser device as set forth in claim 20 wherein the energy of said electron beam is approximately the range of 30 kev. to 150 kev.

22. A laser device as set forth in claim 10 wherein said radiation beam is a photon beam.

23. A laser device as set forth in claim 10 wherein said second layer does not absorb significantly said stimulated recombination radiation.

24. A laser device as set forth in claim 10 wherein said stimulated recombination radiation in the direction perpendicular to the first layer is encouraged and propagation thereof parallel to the first layer is discouraged.

25. A laser device as set forth in claim 10 wherein the thickness of said active layer is approximately in the range of 1 to 20 microns.